United States Patent [19]

Aoyagi

[11] Patent Number: 4,496,217
[45] Date of Patent: Jan. 29, 1985

[54] ACTUATING DEVICE FOR PHOTOGRAPHIC LENS ASSEMBLY

[75] Inventor: Masao Aoyagi, Kanagawa, Japan
[73] Assignee: Canon Kabushiki Kaisha, Tokyo, Japan
[21] Appl. No.: 583,293
[22] Filed: Feb. 28, 1984

Related U.S. Application Data

[63] Continuation of Ser. No. 324,521, Nov. 24, 1981, abandoned.

[30] Foreign Application Priority Data

Nov. 28, 1980 [JP] Japan ............................ 55-170716[U]

[51] Int. Cl.³ .......................... G02B 7/04; F16H 53/06
[52] U.S. Cl. ........................................ 350/255; 74/569
[58] Field of Search ........................ 350/255, 429–430; 354/195; 74/569, 568 FS, 10.35

[56] References Cited

U.S. PATENT DOCUMENTS 3,329,075  7/1967  Padelt ................................. 350/255
3,494,271  2/1970  Muryoi ............................... 350/255
3,731,987  5/1973  Iida et al. ........................... 350/255
3,817,601  6/1974  Colaiace et al. .................... 350/255

Primary Examiner—William H. Punter
Attorney, Agent, or Firm—Toren, McGeady and Stanger

[57] ABSTRACT

In an actuating device for a lens assembly, the lens system of the assembly is mounted in a lens holding member which must be axially moved for focusing the lens assembly. In order to effect axial movement of the holding member, an operating member is fitted on the outer diameter of a cylindrical lens barrel of the assembly to be rotatable about the optical axis of the assembly, with the operating member having an inner peripheral surface wherein there is formed a cam recess for controlling the degree of axial movement of the lens holding member. A cam follower member mounted on the lens holding member is fitted in the cam recess of the operating member and rotative motion of the operating member is converted into axial motion of the lens holding member.

7 Claims, 14 Drawing Figures

ACTUATING DEVICE FOR PHOTOGRAPHIC LENS ASSEMBLY

This is a continuation of application Ser. No. 324,521, filed Nov. 24, 1981, now abandoned.

The present invention relates to a mechanism for moving a lens holder in the lens assembly of a camera and more particularly to a mechanism for enabling movement of the lens holder to occur along an axial linear path by rotation of the distance adjusting or focusing ring of the lens assembly which is fitted at the outermost position of the lens barrel of the assembly.

Conventionally, in focusing mechanisms particularly for cameras having monofocal lens barrels, most of the movable lens holders contain the entire lens system with the inclusion of the diaphragm mechanism. The fact that the diaphragm mechanism is included occurs in view of the cooperation between the diaphragm in the lens assembly and the camera side exposure control mechanism in order to ensure that the lens holder is constrained to move linearly along the optical axis. One approach which satisfies these requirements and which is generally employed involves the use of a double helicoid device.

This type of lens barrel is structured with a stationary helicoid, a rotary helicoid, a linearly movable helicoid, a linear key, a movable lens holder (which in some cases is formed together with the linearly movable helicoid), a distance adjusting focusing ring, and other necessary parts. The stationary helicoid is threadedly fitted on the rotary helicoid wherein there is threadedly fitted the linearly movable helicoid which fixedly carries the movable lens holder. The linearly movable helicoid engages the linear key which is affixed on the stationary helicoid and is restrained from rotation about the optical axis. The distance adjusting ring is connected to the rotary helicoid so that when the distance adjusting ring is rotated, the rotary helicoid will move relative to the stationary helicoid by means of the lead of the screw thread of the rotary helicoid. Meanwhile, the lens holder which is fixedly mounted in the straight helicoid is simultaneously moved by the sum of that lead and a lead of the screw thread of the straight helicoid relative to the rotary helicoid.

In a moving mechanism for a movable lens holder of this type, the number of parts which must be provided is relatively large and all of the parts except the distance adjusting ring and the assembly of the straight helicoid and movable lens barrel are made up of metal material. Furthermore, the stationary helicoid is die cast in order to attempt to reduce the cost of the assembly. However, gas pockets which occur will produce defects in the outer appearance of the parts of the assembly.

Accordingly, in order to maintain a desired outer appearance, a further member is provided which is in the form of a depth scale sleeve. With regard to machining of the parts, the stationary helicoid and the rotary helicoid necessitate screw thread cutting techniques and milling techniques and during assembly there is also required a lapping step for ensuring smooth movement of the three helicoids.

Accordingly, mechanisms for moving a lens holder in a lens assembly in accordance with the prior art involve disadvantages related to the fact that production costs tend to be relatively high. In order to reduce production costs, the helicoid parts could be made as molded parts. In such a case, however, an alternative problem arises in that when the molded parts are threadedly engaged with each other, exessive play tends to be produced or a rubbing impression or sound is imparted to the user of the lens assembly thus contributing to a disagreeable feel during focusing.

Accordingly, the present invention is directed to providing an improved device for moving the lens holder member of a lens assembly wherein conventional drawbacks of prior art devices are eliminated.

SUMMARY OF THE INVENTION

Briefly, the present invention may be described as a lens assembly comprising a cylindrical member or lens barrel having an elongated configuration in the axial direction of the lens assembly, a movable lens holding member supported on the lens barrel and having a lens system mounted therein, an operating member fitted on the outer diameter of the cylindrical member and rotatable about the optical axis of the lens assembly, said operating member having an inner peripheral surface wherein there is formed a cam recess for controlling the degree of axial movement of the lens holder member, and cam follower means mounted on the movable lens holding member and fitted in the cam recess of the operating member whereby the action of rotation of the operating member is converted into axial movement of the movable lens holding member.

Thus, it will be seen that the present invention seeks to employ a cam mechanism instead of the helicoid mechanisms of the prior art and thus to avoid many of the problems arising with helicoid mechanisms. The invention seeks to provide a moving device which is constructed with a decreased number of parts, which facilitates ease of assembly by simplifying construction and arrangement of the parts and which enables the parts to be made by molding techniques with the overall weight being also reduced in order to contribute to better operating characteristics.

By a further feature of the invention, the cam mechanism of the invention is arranged such that the cam follower may be adjustably moved for adjustable positioning thereof relative to the optical axis before it is fixedly secured in place. The invention provides a mechanism rendering it possible to reduce the difficulty of determining the axial position of the lens optical system containing the holder member and to significantly shorten the time necessary for fine adjustment of the position of a focal plane.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described specific embodiments of the invention.

DETAILED DESCRIPTION OF THE PREFERRED EMBODIMENTS

Figure 1:
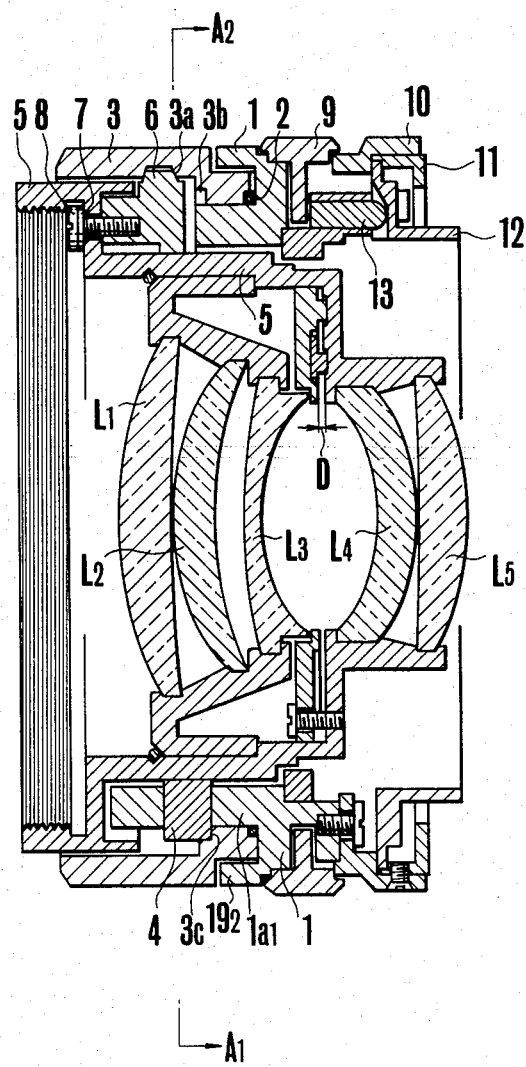
FIG. 1 is an axial sectional view of an interchangeable lens assembly for a single lens reflex camera incorporating a first embodiment of the present invention.
Figure 2:
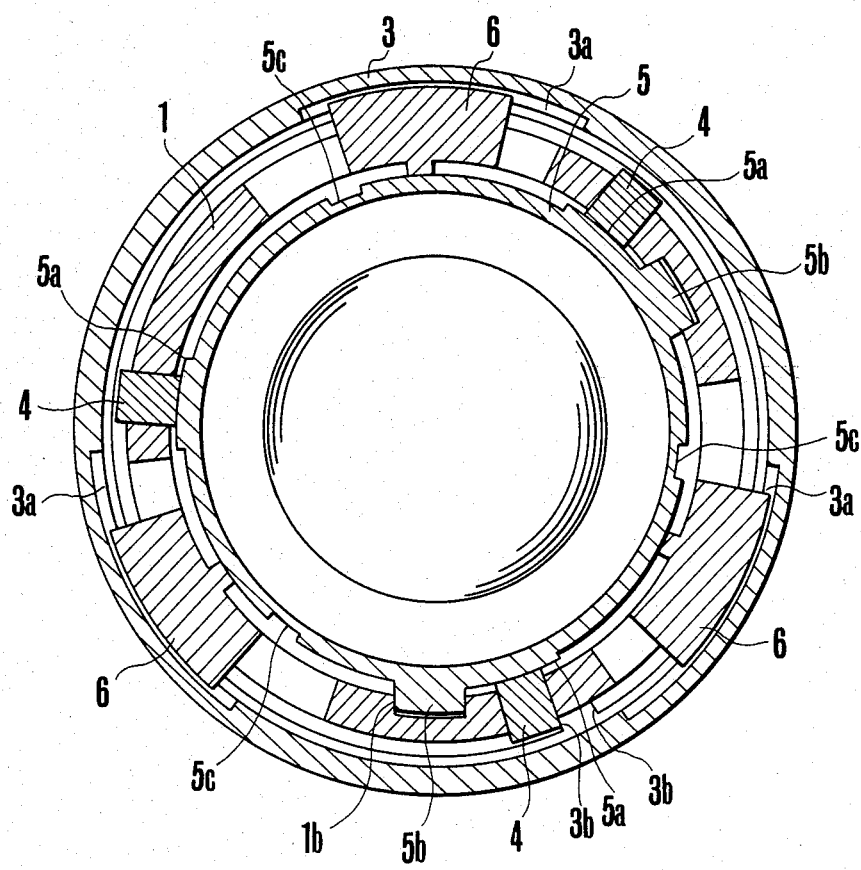
FIG. 2 is a cross-sectional view taken along the line $A_1$–$A_2$ of FIG. 1.

A first embodiment of the invention will be described by reference to FIGS. 1–4 wherein there is depicted an interchangeable lens system for a single lens reflex camera which includes a lens barrel 1 which constitutes a part of the mechanical mounting apparatus for the lens system. The lens barrel 1 is stationary relative to other parts of the assembly and it is fitted with a distance adjusting or focusing ring 3 arranged on the outer diameter of the barrel 1. A lens holding member 5 is included in the lens assembly for mounting and containing therein the lens system of the assembly which, in the case of the embodiment depicted in FIGS. 1–4, consists of five lenses constituting a lens system of the assembly fitted on the inner diameter of the stationary barrel 1.

A diaphragm device contained in the lens holder 5 is responsive to operation of a diaphragm ring 9 to effect presetting of an aperture value and is arranged to be operable from the camera side during release actuation with a housing space D being provided for the diaphragm blades.

Figure 3:
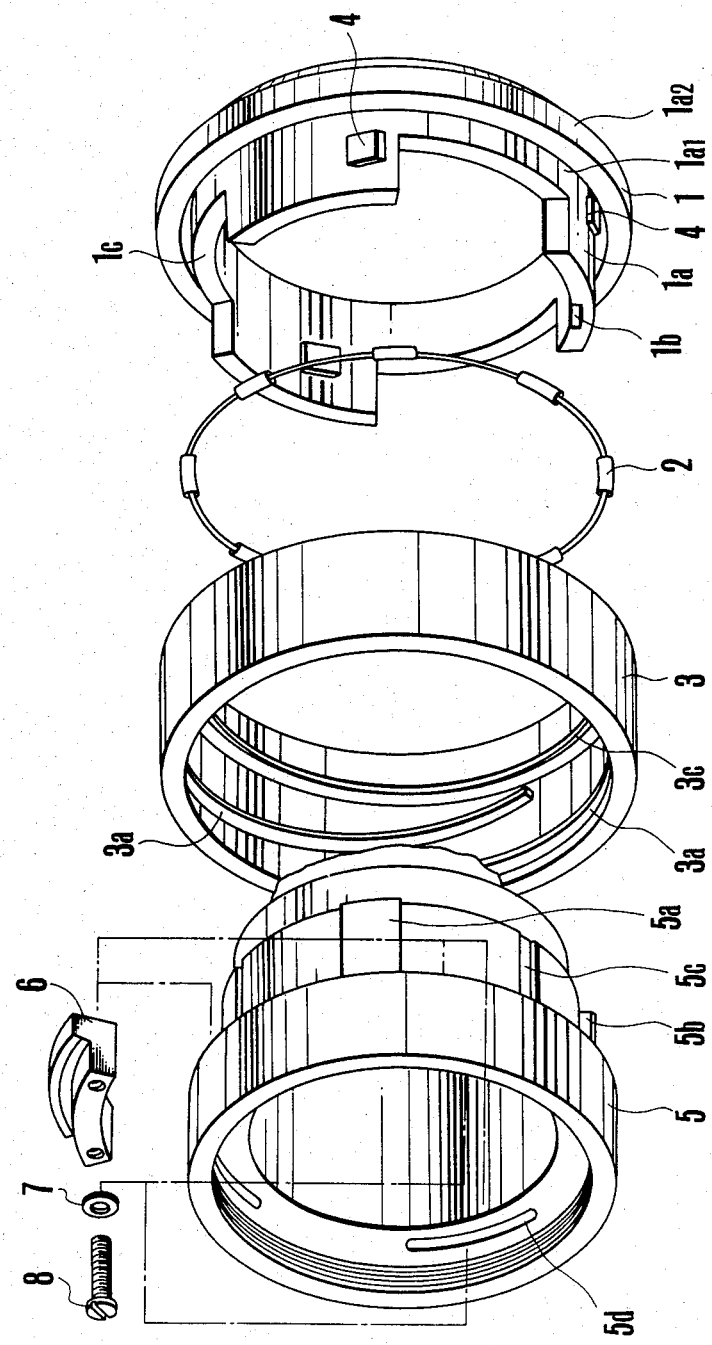
FIG. 3 is an exploded perspective view of the main structural parts of the system depicted in FIG. 1.
Figure 4:
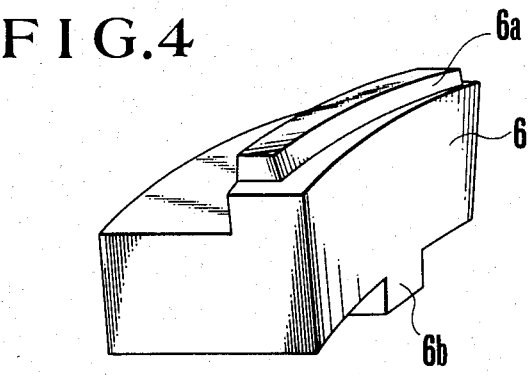
FIG. 4 is a perspective view of the cam follower member utilized with the first embodiment of the invention.

As shown in FIG. 3, the stationary barrel 1 consists of a first tubular body portion $1a_1$, a second tubular body portion $1a_2$, and three cheeks 1a extending axially from the first tubular body portion $1a_1$. A plurality of stopper members 4 for stopping rotation of the distance adjusting ring 3 about the optical axis are mounted on the first tubular body portion $1a_1$ is approximately equal angularly spaced relationship.

The distance adjusting or focusing ring 3 is held so as to be sandwiched between a cross-wall of the stationary barrel 1 and the stopper members 4 in the first tubular body portion $1a_1$ so that the ring 3 will be restrained from axial movement, but will be allowed to rotate about the optical axis.

An annular elastic member 2 having small and large diameter portions alternately arranged thereabout as shown in FIG. 3 is inserted into a space between the distance adjusting ring 3 and the stationary barrel 1 in order to eliminate backlash of the distance adjusting ring 3 in the axial direction.

Formed on the inner surface of the ring 3 are three tracks or cam grooves 3a having a specified curvature for controlling movement of the lens holder 5, lugs 3b which are cooperative with the stopper members 4 and an axial movement restraining face 3c. The cam grooves 3a receive cam follower members 6 at their arcuate surfaces 6a which are fixed to the lens holder 5 by washers 7 and screw fasteners 8 arranged to extend through respective arcuate slots 5d in the lens holder 5.

The slots 5d of the holder 5 are formed with an angularly elongated arcuate shape as shown in FIG. 3 so that the cam follower members 6 may be adjusted to change the angular position thereof whereby fine adjustment of the position of the focal plane may be accurately effected with ease.

The lens holder 5 is formed with areas 5a which engage the radially inner sides of the stopper members 4. Also formed on the lens holder 5 is a longitudinal lug 5b which acts as a key engaging in a key groove 1b formed on the inner peripheral surface of one of the cheeks 1a in order to guide the lens holder 5 for linear movement axially of the lens barrel while simultaneously inhibiting relative rotative movement thereof.

The lens assembly includes a bayonet holder ring 10 which is fixedly mounted on the barrel 1 and which carries a bayonet ring 11 which, when coupled with a bayonet ring (not shown) on a camera, will rigidly attach the lens assembly to the body of the camera. A mount member 12 is arranged to be rotatable relative to the stationary barrel 1 and associated elements of the assembly such as the bayonet holder ring 10 and the bayonet ring 11. A clutch pin 13 extending between the mount member 12 and the barrel 1 operates to effect releasable engagement therebetween and by actuation of the clutch pin 13 the mount member 12 may operate during mounting and dismounting of the lens assembly on a camera body to assure proper alignment and/or locking. A mounting mechanism of the type described herein is known from U.S. Pat. Nos. 4,247,190 and 4,230,403 and, accordingly, further detailed explanation is omitted.

In the operation of the first embodiment of the invention illustrated in FIGS. 1–4, when the distance adjusting ring 3 is rotated about the optical axis, this rotative movement is converted into axial movement of the lens holder 5. The transmission of rotative movement of the ring 3 to the holder 5 occurs through the abutting engagement of the cam face 6a of the cam follower member 6 with the cam face of the cam groove 3a in the ring 3. Additionally, this transmission or conversion of the rotary movement of the ring 3 into axial movement of the lens holder 5 occurs due to the engaging relationship of the longitudinal lug or key portion 5b of the lens holder with the key groove 1b in the inner surface of the cheek 1a of the stationary barrel 1. The range of rotation of the distance adjusting ring 3 is limited by the abutment lug 3b extending inwardly of the inner surface of the distance adjusting ring 3 as engaged with the stopper member 4 projecting outwardly from the stationary barrel 1.

Figure 5:
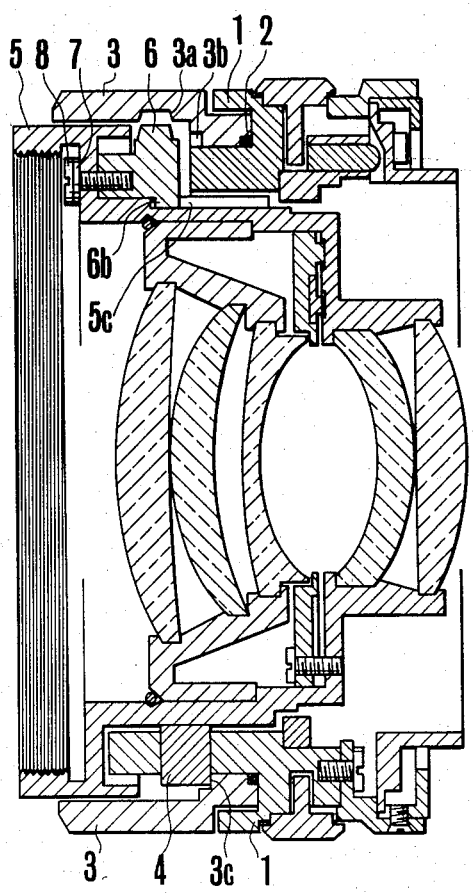
FIG. 5 is an axial sectional view used for describing the procedure for assembling the first embodiment of the invention.

Because of the overall structure of the present invention and due to the particular features thereof, assembly of the lens mechanism may be effected with greatly improved efficiency. The assembly procedure which is involved will be described with reference to FIGS. 1 and 5 and in the process of assembling the lens mechanism, the bayonet holder ring 10, the mount member 12, and the stationary barrel 1 are first assembled as a unit having a fixed attitude which is subsequently assembled with the distance adjusting ring 3. Thereafter, the lens holder 5 with the diaphragm device D and the lens optical system $L_1$-$L_5$ already incorporated therein is inserted into the interior of the stationary barrel 1. The cam follower member 6 may then be fastened to the lens holder 5 in a loose relationship by the screws 8 while the lower radially inwardly extending projections 6b on the members 6 are engaged in axially elongated grooves 5c formed in the lens holder 5 whereby the heads 6a of the cam follower members 6 will be appropriately positioned relative to the outer diameter of the lens holder 5. Thus, as shown in FIG. 5, the lens holder 5 may be inserted into and seated on the inner diameter of the stationary barrel 1 at the required position. Then, the previously described complex operation of adjusting the position of the lens holder 5 relative to the focal plane and of fixedly securing the cam follower members 6 to the lens holder 5 by the screw fasteners 8 may be effected. Thus, the stationary barrel 1 and the lens holder 5 will be assembled to a final unit.

Figure 6A:
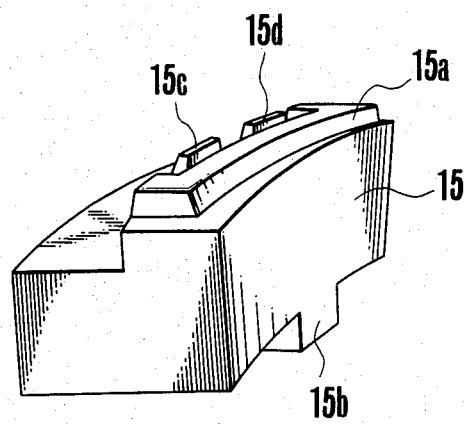
FIG. 6(a) is a perspective view illustrating a further example of the cam follower member of the invention.
Figure 6B:
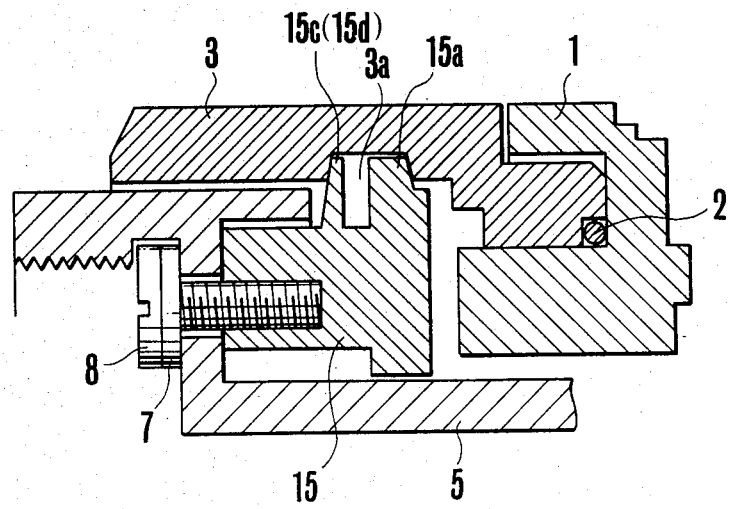
FIG. 6(b) is a sectional view showing a lens mounting arrangement utilizing the cam follower depicted in FIG. 6(a)

FIGS. 6(a) and 6(b) illustrate another example of an arrangement such as that described in connection with FIGS. 1-5 comprising another embodiment of the invention wherein the cam follower member is arranged to provide improved characteristics regarding the interfitting relationship between the cam follower member and the distance adjusting ring. In the embodiment of FIGS. 1-5, axial deviation of the cam follower members 6 and of the distance adjusting ring 3 from ideal values can be absorbed either entirely or in part by the elastic member 2. In the latter case, there will be a backlash as the camming surfaces of the cam portions of the follower members 6 are not always in contact with the respective cam grooves 3a. To remove this residual deviation, therefore, the relative position of the cam follower members 6 is readjusted in order to exert a resistance against the distance adjusting ring 3. This readjustment does not always produce smooth operation of the distance adjusting ring 3 throughout the entire focusing range. With this is mind, the cam follower members 6 may be arranged to produce a resilient action in a manner shown in FIGS. 6(a)-(b) wherein a cam follower member 15 is shown formed with a camming surface 15a and with a lower projected portion 15b which are similar in form and function to elements shown in FIG. 4. Resilient abutment lugs 15c and 15d are formed to extend along a circumferential line which is almost parallel to the camming surface 15a. As shown in the sectional view of FIG. 6(b), the cam portion 15a and the abutment lugs 15c and 15d are fitted in a common cam groove 3a, without allowing for the development of axial play at all stations as a result of the spring force produced by the lugs 15c and 15d.

Figure 7A:
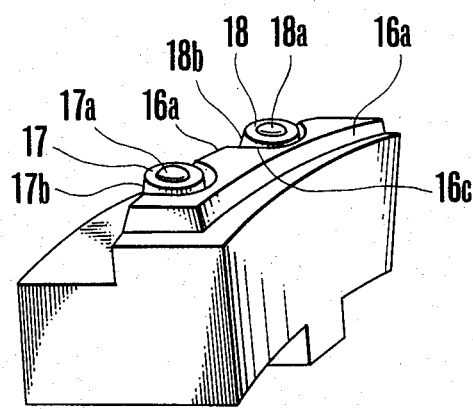
FIG. 7(a) is a perspective view showing another example of the cam follower member of the invention.
Figure 7B:
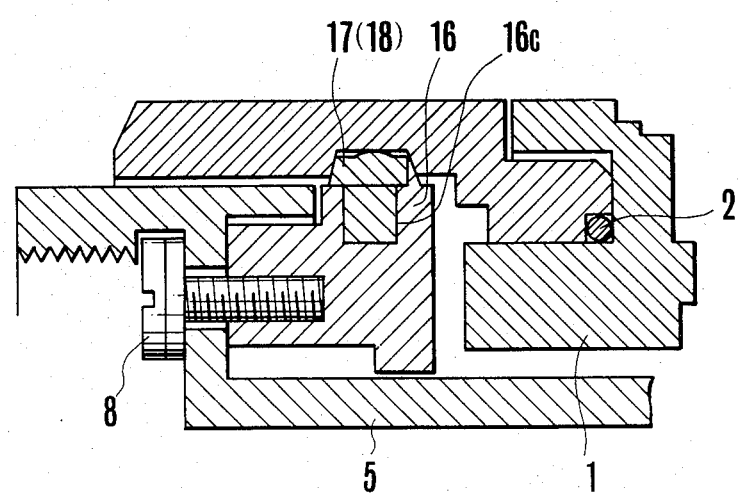
FIG. 7(b) is a sectional view showing a mounting arrangement utilizing the cam follower member depicted in FIG. 7(a)

FIGS. 7(a) and 7(b) illustrate a further example of a modification of the cam follower member of the invention wherein a cam portion 16a is provided with vertical recesses 16c in which there are fitted resilient pieces 17 and 18 which are formed of an elastic material. These resilient pieces 17 and 18 are dimensioned so that heads 17a and 18a thereof will contact the base of the cam groove 3a in order to exert a radial frictional resistance. Inclined walls 17b and 18b of the pieces 17 and 18 will contact the opposite wall of the cam groove 3a to exert an axial frictional reaction.

Figure 8A:
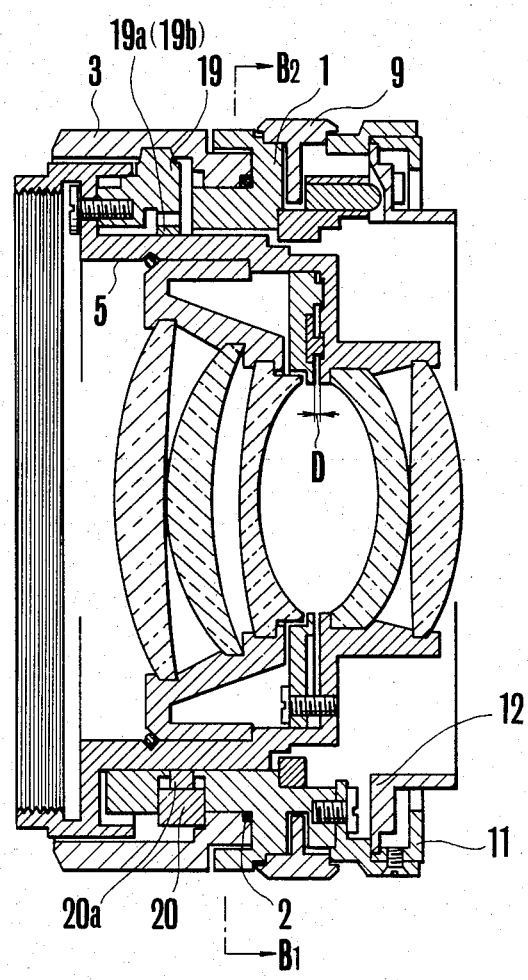
FIG. 8(a) is an axial sectional view showing a lens mounting arrangement employing a further example of a cam follower member and a stop member in accordance with the invention.
Figure 8B:
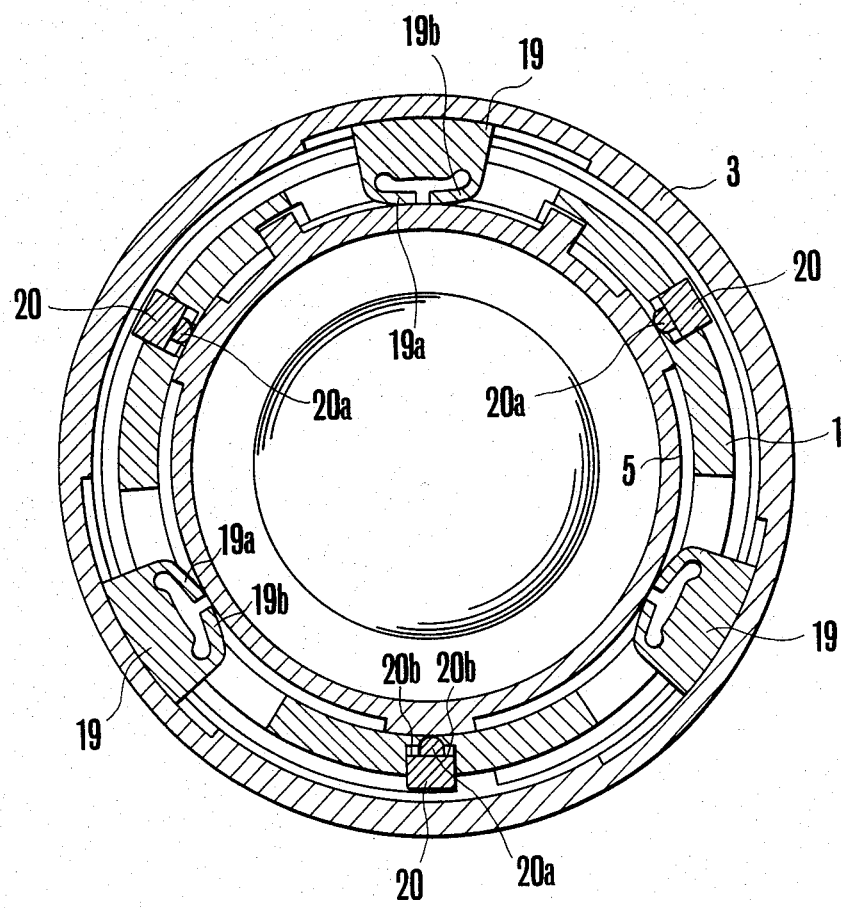
FIG. 8(b) is a transverse sectional view taken along the line $B_1$-$B_2$ of FIG. 8(a)

FIGS. 8(a) and 8(b) illustrate still another example of a cam follower member and stopper member in accordance with the invention. As is known, with lens assemblies of the type to which the present invention relates, when the focusing or distance adjusting ring is provided with an appropriate resistance to movement, this will produce an improved feel or impression during manipulation of the assembly and provide for rapid and easy focusing operation. For this purpose, a cam follower member 19 is provided with resilient pieces 19a and 19b on the inner diameter thereof which contact with the outer peripheral surface of the lens holder 5. Furthermore, as has been described in connection with FIG. 3, during assembly of the lens holder 5 and stationary barrel 1, the stopper members 4 carried on the cheeks 1a are liable to some slippage in the axial direction. Therefore, there will occur some possibility of reduction in the efficiency of the assembly process. In order to avoid such efficiency reduction, a stopper member 20 is formed with a hump 20a on that surface which faces inwardly and the left and right shoulders 20b of the hump 20a function to prevent such slippage.

Figure 9:
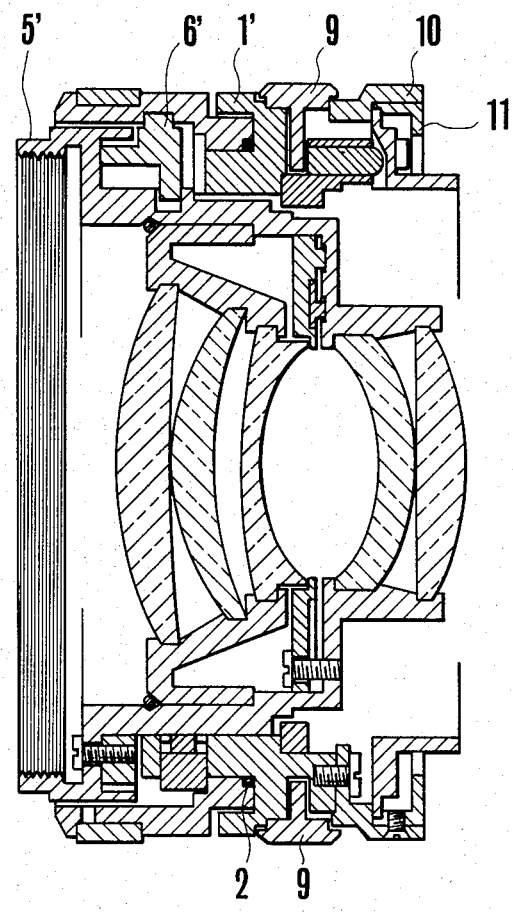
FIG. 9 is an axial sectional view depicting a further embodiment of the invention.
Figure 10:
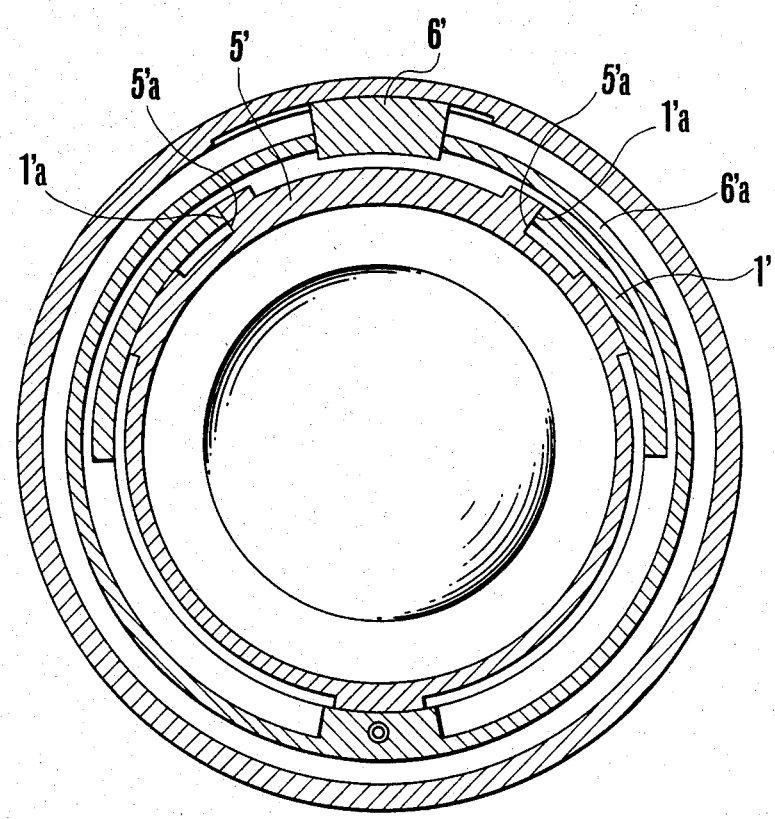
FIG. 10 is a transverse sectional view of the embodiment of FIG. 9.

FIGS. 9 and 10 illustrate a further example of a cam follower member in accordance with the invention.

In FIGS. 9 and 10 there is shown a structure which takes into account incorporation of the movable lens holder whereby a unified form is employed and wherein a resilient portion 6'a is provided in order to impart a resistance against the cam groove 3a of the distance adjusting ring 3. A stationary barrel 1' is formed with a guide groove having a side 1'a which is inclined in the radial direction with which a movable lens holder 5' contacts at a sliding surface 5'a having the same inclination as the side 1'a formed in a portion thereof so that axial movement in enabled. The guide groove 1'a and the sliding surface 5'a also serve to bring the movable lens holder to an on-center position.

Figure 11:
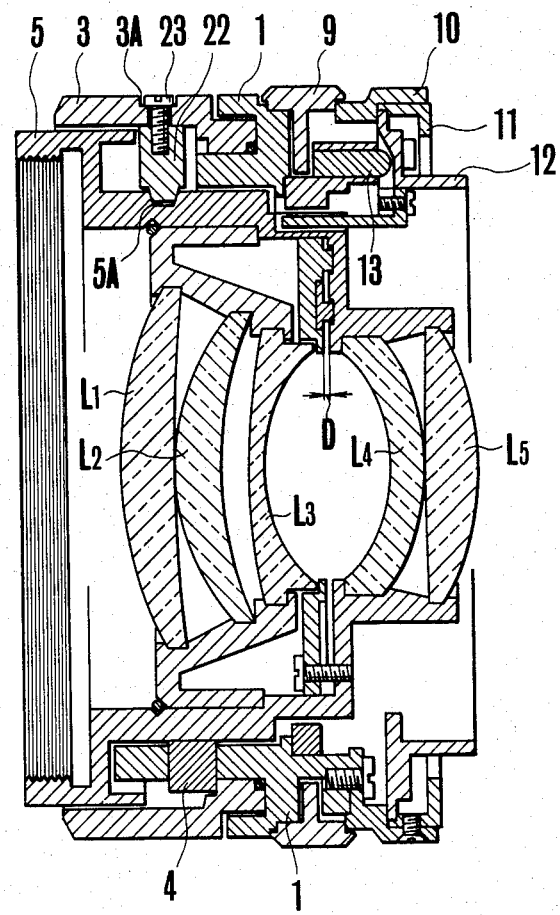
FIG. 11 is an axial sectional view of still another embodiment of the invention.

FIG. 11 illustrates another embodiment of the invention which provides a structure enabling the movable lens to be axially aligned with high accuracy while nevertheless permitting the assembly to proceed without complicated steps and without requiring a longer time than is necessary to establish sufficient accuracy. In the embodiment of FIG. 11, the same reference characters are employed to denote similar parts as those used in the embodiment of FIG. 1.

The characteristic difference from the embodiment of FIG. 1 is in the position or arrangement in the relationship of the cam groove for controlling axial movement of the movable lens group and the engagement member engaging the cam groove.

That is, in the embodiment of FIG. 11, a cam groove 5A is formed in the outer peripheral surface of the lens holding member containing the movable lens group $L_1$-$L_5$ and fitted in the inner diameter of the stationary barrel 1. An engagement or cam follower member 22 is arranged on the inner peripheral surface of the operating member 3 fitted on the outer diameter of the lens holding member 5.

By the construction and arrangement described above in combination with the elongated configuration of a slot 3A for the fastener screw 23 by which the cam follower is affixed to the operating member 3, the axial positional adjustment of the operating member 3 and of the lens holder member 5 may be effected with ease.

That is, by adjusting the tightened position of the screw 23 in the elongated slot 3A, the point at which the cam groove 5A of the lens holding member engages the cam follower 22 can be adjusted. Thus, adjustment of the mounted position of each lens from the reference position of the stationary barrel 1 may be easily effected.

In the embodiment of FIG. 11 described above, the operating member may be molded from synthetic resinous material and it may be formed in a unified form with the cam follower whereby automation of the assembly techniques utilized for the lens mechanism may be increased.

As will be noted from the foregoing, the present invention provides the formation of a cam groove 3a on the inner peripheral surface of the distance adjusting ring 3 and enables mounting of a cam follower member, such as the members 6, 15, 16, 19, on the lens holders 5, 5' in an angularly adjustable position by means of an arcuate slot 5d and it further provides means such as the lug 5b and the key groove 1b which prevent relative rotation of the lens holder 5 and which restrict movement thereof to movement in the axial direction so that the lens holder with the diaphragm device may be linearly movable.

Therefore, the present invention provides an advantage in that the mechanical signal transmission between the diaphragm device and the camera side exposure mechanism is of a relatively simple structure and operates with high accuracy. Furthermore, the cam follower member described above is capable of being adjusted in position about the optical axis of subsequently being fixedly secured in a desired position with the further advantage that the axial positional adjustment of the lens holder, or the focus point adjustment, may be made with great ease while the efficiency of assembly line operation is remarkably improved.

While specific embodiments of the invention have been shown and described in detail to illustrate the application of the inventive principles, it will be understood that the invention may be embodied otherwise without departing from such principles.

What is claimed is:

1. A device for actuating a movable lens defining an optical axis comprising:
   a lens holding member having said movable lens mounted therein, said lens holding member having an outer peripheral surface having formed thereon a cam part for controlling movement of said movable lens;
   a supporting member for supporting said lens holding member;
   an operating member for operating said movable lens;
   a cam following member fixedly mounted on said operating member; and
   adjusting means to adjust fixed positions of said cam following member and said lens holding member, said adjusting means operating to adjust the fixed position of said cam following member in the direction around said optical axis.

2. A device for actuating a movable lens defining an optical axis comprising:
   a lens holding member having said movable lens mounted therein;
   a supporting member for supporting said lens holding member;
   an operating member for operating said movable lens, said operating member having an inner peripheral surface having formed therein a cam part for controlling movement of said movable lens;
   a cam following member fixedly mounted on said lens holding member; and
   stopper means for restricting the rotational position of said operating member, said stopper means having a stopper member fitted in an opening through said supporting member, so as to have an upper end of said stopper member supported on an outer peripheral surface of said lens holding member, said upper end of said stopper member being engageable with a rotational restricting portion of said operating member.

3. A device for actuating a movable lens defining an optical axis comprising:
   a lens holding member having said lens mounted therein;
   a supporting member for supporting said lens holding member;
   an operating member for operating said movable lens;
   shifting means, provided between said lens holding member and said operating member, for shifting said movable lens along said optical axis; and
   stopper means for restricting the rotational position of said operating member,
   said stopper means having a stopper member fitted into an opening through said supporting member, so as to have an upper end of said stopper member supported on an outer peripheral surface of said lens holding member, said upper end of said stopper member being engageable with a rotation restricting portion of said operating member.

4. A device for actuating a movable lens comprising:
   a lens holding member having said movable lens mounted therein;
   a supporting member for supporting said lens holding member;
   an operating member for operating said movable lens, said operating member having an inner peripheral surface having formed therein a cam part for controlling movement of said movable lens; and
   a cam following member fixedly mounted on said lens holding member; and
   adjusting means to adjust fixed positions of said cam follower member and said lens holding member, said adjusting means operating to adjust the fixed position of said cam follower member in the direction around the optical axis.

5. A device according to claim 4 wherein said lens holding member includes slate for displacing said cam follower member to avoid interference thereof with said cam part of said operaing member.

6. A device according to claim 4 wherein said cam follower member is made of elastic material and has first projected portions contacting with the cam surface of said operating member and second projected portions contacting with the surface thereof being opposite to said cam surface to absorb play between said cam portion of said operating member and said cam follower member by the resilience of said first and second projected portions.

7. A device according to claim 5 wherein said cam follower member is made of elastic material and has first projecting portions contacting with the cam surface of said operating member and second projected portions contacting with the surface thereof being opposite to said cam surface to absorb play between said cam portion of said operating member and said cam follower member by the resilience of said first and second projected portions.

* * * * *